(12) United States Patent
Meesters et al.

(10) Patent No.: US 7,772,346 B2
(45) Date of Patent: Aug. 10, 2010

(54) HIGHLY STEREOREGULAR POLYPROPYLENE WITH IMPROVED PROPERTIES

(75) Inventors: Els Meesters, Kortessem (BE); Jean News, Ferrara (FR); Alessandro Guidicini, Ferrara (FR)

(73) Assignee: Basell Poliolefine Italia s.r.l., Milan (IT)

( * ) Notice: Subject to any disclaimer, the term of this patent is extended or adjusted under 35 U.S.C. 154(b) by 903 days.

(21) Appl. No.: 11/496,924

(22) Filed: Aug. 1, 2006

(65) Prior Publication Data

US 2006/0264585 A1    Nov. 23, 2006

Related U.S. Application Data

(63) Continuation of application No. 10/522,957, filed as application No. PCT/EP03/08491 on Jul. 30, 2003, now Pat. No. 7,112,642.

(60) Provisional application No. 60/416,991, filed on Oct. 8, 2002.

(30) Foreign Application Priority Data

Aug. 1, 2002    (EP)    ................................. 02017287

(51) Int. Cl.
*C08F 10/06*    (2006.01)
(52) U.S. Cl. ................. 526/348.1; 526/351; 526/124.1; 526/124.2; 526/124.3; 526/142; 502/103; 502/118; 502/125; 502/127
(58) Field of Classification Search ................. 526/351, 526/348.1, 124.1, 124.2, 124.3, 142; 502/103, 502/118, 125, 127
See application file for complete search history.

(56) References Cited

U.S. PATENT DOCUMENTS

| | | |
|---|---|---|
| 4,298,718 A | 11/1981 | Mayr et al. |
| 4,399,054 A | 8/1983 | Ferraris et al. |
| 4,469,648 A | 9/1984 | Ferraris et al. |
| 4,495,338 A | 1/1985 | Mayr et al. |
| 4,820,772 A * | 4/1989 | Goto et al. ................. 524/83 |
| 5,698,642 A | 12/1997 | Covezzi et al. |
| 6,413,477 B1 | 7/2002 | Covezzi et al. |
| 7,022,640 B2 | 4/2006 | Albizzati et al. |
| 7,049,377 B1 | 5/2006 | Albizzati et al. |
| 7,074,871 B2 | 7/2006 | Cecchin et al. |
| 7,332,556 B2 | 2/2008 | Cecchin et al. |
| 2003/0060581 A1 | 3/2003 | Morini et al. |

FOREIGN PATENT DOCUMENTS

| | | | |
|---|---|---|---|
| EP | 0573862 | | 12/1993 |
| EP | 573862 | | 12/1993 |
| EP | 0728769 | | 8/1996 |
| EP | 728769 | | 8/1996 |
| EP | 782587 | | 7/1997 |
| EP | 0782587 | | 7/1997 |
| EP | 0 916 701 | * | 5/1999 |
| EP | 0916701 | | 5/1999 |
| JP | 2002-284942 | * | 10/2002 |
| JP | 2002-284942 | | 10/2003 |
| WO | WO 99/14260 | * | 3/1999 |
| WO | 0063261 | | 10/2000 |
| WO | 0157099 | | 8/2001 |
| WO | 0230998 | | 4/2002 |
| WO | 03055831 | | 7/2003 |

OTHER PUBLICATIONS

Y. Inoue et al., "Studies of the stereospecific polymerization mechanism of propylene by a modified Ziegler-Natta catalyst based on 125 M Hz $^{13}C$ n.m.r. spectra," *Polymer*, vol. 25, p. 1640-1644 (1984).

R. Chujo et al., "Two-site model analysis of $^{13}C$ n.m.r. of polypropylene polymerized by Ziegler-Natta catalyst with external alkoxysilane donors," *Polymer*, vol. 35(2), p. 339-342 (1994).

* cited by examiner

Primary Examiner—Ling-Siu Choi
(74) Attorney, Agent, or Firm—Jarrod N. Raphael

(57) ABSTRACT

Propylene polymers having a content of isotactic pentads (mmmm) higher than 97%, molecular weight distribution, expressed by the formula (a) ratio, equal to or higher than 6 and a value of formula (b) ratio equal to or lower than 5.5. The said polymers are prepared in the presence of a particular combination of Ziegler-Natta solid catalyst components and highly stereoregulating electron-donor compounds. Laminated articles, in particular bi-axially oriented films and sheets, can be prepared with the said polymers.

$$\overline{M}_w/\overline{M}_n \quad (a)$$

$$\overline{M}_z/\overline{M}_w \quad (b)$$

16 Claims, No Drawings

HIGHLY STEREOREGULAR POLYPROPYLENE WITH IMPROVED PROPERTIES

The present invention relates to crystalline propylene polymers having a high level of chain stereoregularity, in particular a high content of isotactic pentads, improved processability in the molten state and the process for preparation thereof.

It is known that, thanks to high stereospecificity levels reached by the Ziegler-Natta catalysts, today one can prepare highly crystalline propylene polymers having high mechanical properties and they are, therefore, adequate for the manufacture of articles with good stiffness and mechanical resistance, even if they are small and thin. The common used propylene polymers show high enough levels of melt strength, i.e. viscoelasticity in the molten state.

It is known that non-highly enough levels of melt strength of propylene polymers cause an irregular deformation of the molten mass during the conversion processes with the subsequent problems related to workability.

European patent application No. 573 862 discloses that melt strength can be significantly improved by widening the molecular weight distribution of a polymer. According to the patent, the molecular weight distribution is at least 20. Consequently, the workability of highly crystalline propylene polymers improves. However, the thickness profile and consistency of the oriented films obtained from said propylene polymers are not totally satisfactory yet.

It has now been found that by using in polymerization, under suitable conditions, a particular combination of Ziegler-Natta solid catalyst components and highly stereoregulating electron-donor compounds (outside donors), it is possible to obtain propylene polymers still characterized by high stiffness and other mechanical properties typical of highly crystalline propylene polymers, but also by improved workability in spite of a medium broad molecular weight distribution. In particular, the advantages are that the present propylene polymers can be processed at a broad range of temperatures and thus are easier processable.

A further embodiment of the present invention, relates to biaxially oriented films or sheets comprising the said propylene polymers.

The advantage of laminated articles, in particular films and sheets, of the present invention is that they have good uniform thickness and also higher elongation at break and higher tensile stress at break.

The present laminated articles, in particular films or sheets, are especially used in packaging of parcels, such as cigarette parcels, and in food packaging.

Therefore the present invention provides propylene polymers, preferably homopolymers, having the following features:

1) a content of isotactic pentads (mmmm), measured by NMR, higher than 97%, preferably higher than 97.5%, more preferably higher than 98%;
2) a molecular weight distribution, expressed by the ratio of weight average molecular weight to number average molecular weight ($\overline{M}_w/\overline{M}_n$), equal to or higher than 6, preferably from 6 to 11; and
3) a value of ratio of z average molecular weight to weight average molecular weight ($\overline{M}_z/\overline{M}_w$) equal to or lower than 5.5, preferably equal to or lower than 5, more preferably up to 4.8.

Optionally the said propylene polymers can contain minor amounts of comonomers, like ethylene or $C_4$-$C_{10}$ α-olefins (examples of which are 1-butene, 1-hexene, 3-methyl-1-pentene). Generally, when present, such comonomers do not exceed 5% by weight (preferably 2% by weight in the case of ethylene) with respect to the total weight of the polymer.

Other preferred features for the polymers of the present invention are:
- a stereoblock content up to 98° C. of 10% or lower measured by the Temperature Raising Elution Fractionation (TREF) method;
- a content of fraction soluble in xylene at room temperature (about 23° C.) equal to or lower than 2.5% by weight, more preferably equal to or lower than 2% by weight;
- a Polydispersity Index (P.I.) of 6 or less, more preferably of 5.5 or less, in particular less than 5;
- a value of the main elution peak temperature (measured by TREF) higher than 114° C.;
- a value of the fraction eluted up to 94° C. (TREF) equal to or lower than 5%;
- an MFR value from 0.1 to 50 g/10 min, more preferably from 1 to 30 g/10 min;

The preferred polymers according to the present invention have a melting point of 164° C. or higher, more preferably of 165° C. or higher, such as from 165 to 168° C.

The propylene polymers of the present invention can be obtained directly in polymerization by using a Ziegler-Natta catalyst comprising:
- a solid catalyst component comprising Mg, Ti, halogen and at least two electron donor compounds, said catalyst component being characterised by the fact that at least one of the electron donor compounds, which is present in an amount from 15 to 50% by mol with respect to the total amount of electron-donor compounds, is selected from esters of succinic acids which are not extractable, under the conditions described below, for more than 20% by mol (non-extractable succinates) and at least another electron donor compound which is extractable, under the same conditions, for more than 30% by mol (extractable electron donor compounds);
- an organo-metal compound;
- a highly stereoregulating electron donor compound (outside donor).

The said catalyst component is described in WO 02/30998.

As explained above, the solid catalyst component comprises, in addition to the above electron donor compounds, Ti, Mg and halogen. In particular, the catalyst component comprises a titanium compound, having at least a Ti-halogen bond and the above mentioned electron donor compounds supported on a Mg halide. The magnesium halide is preferably $MgCl_2$ in active form, which is widely known from the patent literature as a support for Ziegler-Natta catalysts. U.S. Pat. Nos. 4,298,718 and 4,495,338 were the first to describe the use of said compounds in Ziegler-Natta catalysis. It is known from said patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula $Ti(OR)_{n-y}X_y$ can be used, where n is the valence of titanium, y is a number between 1 and n−1, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to said procedure are described in U.S. Pat. No. 4,399,054 and U.S. Pat. No. 4,469,648. The so obtained adduct can be directly reacted with Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compounds can be added during the treatment with TiCl$_4$. They can be added together in the same treatment with TiCl$_4$ or separately in two or more treatments.

Regardless to the preparation method used, the final amount of the two or more electron donor compounds is such that the molar ratio with respect to the MgCl$_2$ is from 0.01 to 1, preferably from 0.05 to 0.5.

Among the non-extractable succinates mentioned above, particularly preferred are the succinates of formula (I) below

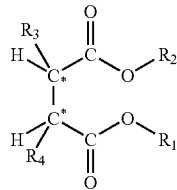

(I)

in which the radicals R$_1$ and R$_2$, equal to, or different from, each other are a C$_1$-C$_{20}$ linear or branched alkyl, alkenyl, cycloalkyl, aryl, arylalkyl or alkylaryl group, optionally containing heteroatoms; and the radicals R$_3$ and R$_4$ equal to, or different from, each other, are C$_1$-C$_{20}$ alkyl, cycloalkyl, aryl, arylalkyl or alkylaryl group, optionally containing heteroatoms with the proviso that at least one of them is a branched alkyl; said compounds being, with respect to the two asymmetric carbon atoms identified in the structure of formula (I), stereoisomers of the type (S,R) or (R,S) that are present in pure forms or in mixtures.

R$_1$ and R$_2$ are preferably C$_1$-C$_8$ alkyl, cycloalkyl, aryl, arylalkyl and alkylaryl groups.

Particularly preferred are the compounds in which R$_1$ and R$_2$ are selected from primary alkyls and in particular branched primary alkyls. Examples of suitable R$_1$ and R$_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the R$_3$ and/or R$_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the extractable electron donor compounds particularly preferred are the esters of mono or dicarboxylic organic acids such as benzoates, malonates, phthalates and succinates. Preferred are esters of aromatic carboxylic acids.

Among malonates particularly preferred are those of formula (II):

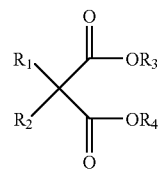

(II)

where R$_1$ is H or a C$_1$-C$_{20}$ linear or branched alky, alkenyl, cycloalkyl, aryl, arylalkyl or alkylaryl group, R$_2$ is a C$_1$-C$_{20}$ linear or branched alkyl, alkenyl, cycloalkyl, aryl, arylalkyl or alkylaryl group, R$_3$ and R$_4$, equal to, or different from, each other, are C$_1$-C$_{20}$ linear or branched alkyl groups or C$_3$-C$_{20}$ cycloalkyl groups.

Preferably, R$_3$ and R$_4$ are primary, linear or branched C$_1$-C$_{20}$ alkyl groups, more preferably they are primary branched C$_4$-C$_{20}$ alkyl groups such as isobutyl or neopentyl groups.

R$_2$ is preferably, in particular when R$_1$ is H, a linear or branched C$_3$-C$_{20}$ alkyl, cycloalkyl, or arylalkyl group; more preferably R$_2$ is a C$_3$-C$_{20}$ secondary alkyl, cycloalkyl, or arylalkyl group.

Preferred esters of aromatic carboxylic acids are selected from C$_1$-C$_{20}$ alkyl or aryl esters of benzoic and phthalic acids, possibly substituted. The alkyl esters of the said acids being preferred. Particularly preferred are the C$_1$-C$_6$ linear or branched alkyl esters. Specific examples are ethylbenzoate, n-butylbenzoate, p-methoxy ethylbenzoate, p-ethoxy ethylbenzoate, isobutylbenzoate, ethyl p-toluate, diethyl phthalate, di-n-propyl phthalate, di-n-butyl phthalate, di-n-pentyl phthalate, di-1-pentyl phthalate, bis(2-ethylhexyl) phthalate, ethyl-isobutyl phthalate, ethyl-n-butyl phthalate, di-n-hexyl phthalate, di-isobutylphthalate.

The previously said organo-metal compound is preferably chosen among alkyl-Al compounds and in particular among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as AlEt$_2$Cl and Al$_2$Et$_3$Cl$_3$, possibly in mixture with the above cited trialkylaluminums.

Suitable outside electron-donor compounds include certain silanes, ethers, esters, amines, heterocyclic compounds and ketones. In particular, suitable highly stereoregolating silanes are comprised in the class having formula $R_a^5R_b^6Si(OR^7)_c$, where a and b are integers from 0 to 2, c is an integer from 1 to 4 and the sum (a+b+c) is 4; $R^5$, $R^6$ and $R^7$ are alkyl, alkylen, cycloalkyl or aryl radicals with 1 to 18 carbon atoms, optionally containing heteroatoms Particularly preferred are the silicon compounds in which at least one of $R^5$ and $R^6$ is selected from branched alkyl and cycloalkyl groups with 3 to 10 carbon atoms and $R^7$ is a $C_1$-$C_{10}$ alkyl group, in particular methyl. Specific examples of preferred silanes are dicyclopentyldimethoxysilane, tert-hexyltrimethoxysilane and diisopropyldimethoxysilane. Dicyclopentyldimethoxysilane is particularly preferred.

The outside donor is used in such an amount to give a molar ratio of the organoaluminum compound to said outside electron donor compound of from 0.1 to 500, preferably from 1 to 300 and more preferably from 3 to 100.

The polymerisation process can be carried out according to known techniques, for example slurry polymerisation using as diluent an inert hydrocarbon solvent, or bulk polymerisation using the liquid monomer (for example propylene) as a reaction medium. Moreover, it is possible to carry out the polymerisation process in gas-phase operating in one or more fluidised or mechanically agitated bed reactors.

The polymerisation is generally carried out at temperature of from 20 to 120° C., preferably of from 40 to 80° C. When the polymerisation is carried out in gas-phase the operating pressure is generally between 0.5 and 10 MPa, preferably between 1 and 6 MPa. In the bulk polymerisation the operating pressure is generally between 1 and 8 MPa, preferably between 1.5 and 5 MPa.

It is particular worth noting that the said broad range of values of molecular weight distribution is obtained in a single polymerisation stage, i.e. with a substantially monomodal distribution which allows to avoid any problem due to non homogeneity of the polymer product.

According to a preferred polymerisation process the polymers of the present invention can be produced by a gas-phase polymerisation process carried out in at least two interconnected polymerisation zones. The said type of process is illustrated in European patent application 782 587.

In detail, the above-mentioned process comprises feeding one or more monomer(s) to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

The process can be carried out under operating pressures of between 0.5 and 10 MPa, preferably between 1.5 to 6 MPa.

Advantageously, one or more inert gases is/are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The usual additives, such as stabilizers and pigments, can also be added to the polymers and compositions of the present invention.

As mentioned above, the propylene polymers according to the present invention are particularly suitable to prepare films and sheets, in particular biaxially oriented films and sheets.

A further embodiment of the present invention provides laminated articles, in particular films and sheets, having improved stretchability and barrier properties, in particular moisture barrier properties. The said articles are made of polymer compositions comprising the above-mentioned polymers and a hard resin, such as polymers of coke oven gas, cracked naphtha, gas oil and terpene oil and terpene resin. Terpene compounds are preferred. The hard resin is generally in an amount of from 0.5 to 20% by weight, preferably form 0.5 to 15%, with respect to the whole composition.

The laminated articles, i.e. films and sheets, of the present invention can be multilayered and at least one layer comprises the above-mentioned propylene polymers or compositions.

The laminated articles, i.e. films and sheets, of the present invention are obtained from the above-mentioned propylene polymers and compositions by using the well-known processes for polyolefin films/sheets production.

The following examples are given in order to illustrate but not to limit the present invention.

Characterizations

Test for the Extractability of the Electron Donor (ED) Compounds

A. Preparation of the Solid Catalyst Component

Into a 500 mL four-necked round flask, purged with nitrogen, 250 mL of $TiCl_4$ are introduced at 0° C. While stirring, 10.0 g of microspheroidal $MgCl_2.2.5C_2H_5OH$ (prepared according to the method described in example 2 of U.S. Pat. No. 4,399,054 but operating at 3,000 rpm instead of 10,000) are introduced. 4.4 mmols of the selected electron donor compound are also added.

The temperature is raised to 100° C. and maintained at said temperature for 120 min. Then, the stirring is discontinued, the solid product is allowed to settle and the supernatant liquid is siphoned off.

250 mL of fresh $TiCl_4$ are added. The mixture is reacted at 120° C. for 60 min under stirring and, then, the supernatant liquid is siphoned off. The solid (A) is washed six times with anhydrous hexane (100 mL each time) at 60° C., dried under vacuum and analyzed for the quantitative determination of Mg and electron donor compound. The molar ratio of electron donor compound to Mg (ratio A) is thus determined.

B. Treatment of Solid A

In a 250 mL jacketed glass reactor with mechanical stirrer and filtration septum are introduced under nitrogen atmosphere 190 mL of anhydrous n-hexane, 19 millimoles of $AlEt_3$ and 2 g of the catalyst component prepared as described in A. The mixture is heated at 60° C. for 1 hour under stirring (stirring speed at 400 rpm). After said time the mixture is filtered, washed four times with n-hexane at 60° C. and finally dried under vacuum for 4 hours at 30° C. The solid is then analyzed for the quantitative determination of Mg and electron donor compound. The molar ratio of electron donor compound to Mg (ratio B) is thus determined.

The extractability of the election donor compound is calculated according to the following formula: % of electron-donor compound extracted=(Ratio A−Ratio B)/Ratio A.

Polymer Microstructure Analysis 50 mg of each xylene insoluble fraction are dissolved in 0.5 mL of $C_2D_2Cl_4$.

The $^{13}C$ NMR spectra are acquired on a Bruker DPX400 (100.61 Mhz, 90° pulse, 12 s delay between pulses). About 3000 transients are stored for each spectrum; mmmm pentad peak (21.8 ppm) is used as reference.

The microstructure analysis is carried out as described in literature (*Polymer*, 1984, 25, 1640, by Inoue Y et Al. and *Polymer*, 1994, 35, 339, by Chujo R. et Al.).

Determination of Xylene Insoluble Fraction (X.I.)

2.5 g of polymer are dissolved in 250 mL of o-xylene under stirring at 135° C. for 30 minutes, then the solution is cooled to 25° C. and after 30 minutes the insoluble polymer is filtered. The resulting solution is evaporated in nitrogen-flow and the residue is dried and weighed to determine the percentage of soluble polymer and then, by difference, the X.I. %.

TREF Method

TREF fractionation of the polymer is carried out by dissolving 1 g of propylene polymer in o-xylene at 135° C. and slowly cooling (20 h) to 25° C. in a column loaded with glass beads. Elution with o-xylene (600 mL/h) is first carried out at 25° C. for 1 h to obtain a xylene-soluble fraction. The column temperature is then raised from 25 to 95° C. at a rate of 0.7° C./min without elution and the temperature is held at 95° C. for 2 h before eluting at this temperature for 1 hour to yield a single fraction. Finally, elution is continued while raising the temperature from 95 to 120° C. at a rate of 3° C./h, collecting individual fractions at temperature intervals of 1° C. According to the present invention the stereoblock content is considered as the total weight of the fractions, insoluble in xylene at 25° C., that are eluted at a temperature lower than 100° C. based on the total weight of the polymer.

Melt Flow Rate (MFR)

Measured according to ISO 1133 (230° C., 2.16 kg).

Molecular Weight ($\overline{M}_n$, $\overline{M}_w$ and $\overline{M}_z$)

Measured by way of gel permeation chromatography (GPC) in 1,2,4-trichlorobenzene.

Determination of Polydispersity Index (P.I.)

This property is strictly connected with the molecular weight distribution of the polymer under examination. In particular it is inversely proportional to the creep resistance of the polymer in the molten state. Said resistance called modulus separation at low modulus value (500 Pa), is determined at a temperature of 200° C. by using a parallel plates rheometer model RMS-800 marketed by RHEOMETRICS (USA), operating at an oscillation frequency which increases from 0.1 rad/sec to 100 rad/sec. From the modulus separation value, one can derive the P.I. by way of the equation:

$$P.I.=54.6\times(\text{modulus separation})^{-1.76}$$

in which the modulus separation is defined as:

modulus separation=frequency at G'=500 Pa/frequency at G"=500 Pa wherein G' is storage modulus and G" is the loss modulus.

Flexural Modulus

Measured according to ISO method 178.

Izod Impact Resistance

Measured according to ISO method 180/1 A.

EXAMPLES 1 and 2

Preparation of Solid Catalyst Component.

Into a 500 mL four-necked round flask, purged with nitrogen, 250 mL of $TiCl_4$ are introduced at 0° C. While stirring, 10.0 g of microspheroidal $MgCl_2.2.8C_2H_5OH$ (prepared according to the method described in example 2 of U.S. Pat. No. 4,399,054 but operating at 3,000 rpm instead of 10,000) are introduced. As internal donors, a previously mixture of diisobutylphthalate (DIBP) and a blend of both the racemic form and meso form of diethyl 2,3-(diisopropyl)succinate (DIBIPS) are also added. The internal donor content in the solid catalyst component is shown in Table 1.

The temperature is raised to 100° C. and maintained for 120 minutes. Then, the stirring is discontinued, the solid product is allowed to settle and the supernatant liquid is siphoned off.

250 mL of fresh $TiCl_4$ are added. The mixture is reacted at 120° C. for 60 minutes and, then, the supernatant liquid is siphoned off. The solid is washed six times with anhydrous hexane (100 ml each time) at 60° C.

Polymerisation

In a 4 liter autoclave, purged with nitrogen flow at 70° C. for one our, 75 mL of anhydrous hexane containing 7 mmols of $AlEt_3$, dicyclopentyldimethoxysilane as external electron-donor compound (the amount is reported in Table 1) and the solid catalyst component are introduced in propylene flow at 30° C. The autoclave is closed, 1.5 NL of hydrogen are added and then, under stirring, 1.2 kg of liquid propylene are fed. The temperature is risen to 70° C. in five minutes and the polymerisation is carried out at this temperature for two hours. The unreacted propylene is vented, the polymer is recovered and dried at 70° C. under vacuum for three hours and, then, weighed and fractionated with o-xylene to deter mine the amount of the xylene insoluble (X.I.) fraction at 25° C. and its microstructure.

The polymerisation conditions are reported in Table 1.

EXAMPLE 3

Example 1 is repeated with except that in the polymerisation a mixture of 70 wt % of dicyclopentyldimethoxysilane and 30 wt % of cyclohexylmethyldimethoxysilane as outside electron-donor compound is used.

The polymerisation conditions are reported in Table 1.

EXAMPLE 4

Example 1 is repeated except that adduct of $MgCl_2$ with ethanol is dealcoholated as described in example 1 of European patent application 728 769.

The polymerisation conditions are reported in Table 1.

COMPARATIVE EXAMPLE 1 (1c)

Preparation of Solid Catalyst Component.

The solid catalyst component is prepared according to above example 1, except that it contains a diether, namely 9,9-bis(methoxymethyl)fluorene, as inside electron-donor compound in the place of phthalate and succinate derivatives.

The internal donor content in the solid catalyst component is shown in Table 1.

Polymerisation

The polymerisation is carried out in continuous in a series of two reactors equipped with devices for the transfer of the product coming from the reactor immediately preceding to the one immediately following.

In the gas phase the hydrogen and the monomer are analysed in continuous and fed in such a manner that the desired concentration will be maintained constant.

A mixture of triethylaluminum activator and dicyclopentyldimethoxysilane as outside electron-donor compound is contacted with the solid catalyst component in a container at 40° C. for 13 minutes.

The catalyst is then transferred to a reactor containing an excess of liquid propylene and prepolymerised at 20° C. for a period-ranging from 1.5 to 2 minutes ca.

The prepolymer is then transferred in another reactor where the polymerisation occurs in gas phase to form fraction (A).

The product of the above reactor is fed to a second reactor in gas phase to form fraction (B).

The polymerisation conditions are reported in Table 1.

TABLE 1

| | | Example | | | | |
|---|---|---|---|---|---|---|
| | | 1 | 2 | 3 | 4 | 1c |
| Internal electron donor | DIBIPS content, wt % | 4.54 | 6.79 | 6.79 | 4.63 | 0 |
| | DIBP content, wt % | 12.8 | 11.68 | 11.68 | 6.63 | 0 |
| | Diether content, wt % | 0 | 0 | 0 | 0 | 16.4 |
| DIBIPS/DIBP molar ratio | | 0.35 | 0.63 | 0.63 | 0.75 | 0 |
| Solid catalyst component fed, g/h | | 8.2 | 7 | 6.6 | 6 | — |
| $AlEt_3$/solid catalyst component, g/g | | 10 | 13 | 14 | 13 | 6.1 |
| $AlEt_3$/outside donor weight ratio | | 30 | 15 | 4 | 8 | 5.8 |
| Polymerisation temperature, ° C. | | 70 | 70 | 70 | 75 | 70 |

The physical and mechanical properties of the polymers of examples 1 to 4 and comparative example 1 are reported in Table 2. The mechanical properties are measured on injection-moulded samples. Plaques of examples and comparative example are stretched at temperatures ranging from 140 up to 155° C., in steps of 5° C.

TABLE 2

| | Example | | | | |
|---|---|---|---|---|---|
| | 1 | 2 | 3 | 4 | 1c |
| mmmm, % | >98 | 98.52 | >98 | 98.61 | 98.43 |
| $\overline{M}_w/\overline{M}_n$ | 9.2 | 9.6 | 8.7 | — | — |
| $\overline{M}_z/\overline{M}_w$ | 4.2 | 4.1 | 4.8 | — | — |
| Main elution peak temperature, ° C. | — | 114 | — | 117 | 113 |
| Stereoblock content up to 95° C., wt % | — | 5.2 | — | — | 6.4 |
| Stereoblock content up to 98° C., wt % | — | 5.2 | — | 6.2 | 6.2 |
| Fraction eluted up to 94° C., % | — | — | — | 4.6 | 4.1 |
| MFR, g/10 min | 3.5 | 3.5 | 2.6 | 2.6 | 3.5 |
| Xylene-soluble fraction, wt % | 1.7 | 1.6 | 1.4 | 1.5 | 1.3 |
| Polydispersity index | 4.8 | 5 | 4.9 | 4.6 | 5.5 |
| Melting temperature, ° C. | 163 | 163 | 163 | 165.7 | 162 |
| Mechanical properties of the polymer | | | | | |
| Flexural modulus, MPa | 1725 | 1770 | 1850 | 1780-1940 | 1810-1885 |
| Izod impact resistance at 23° C., $kJ/m^2$ | 4.5 | 4.6 | 6 | 5.1 | 4.6 |

EXAMPLE 5 AND COMPARATIVE EXAMPLE 2 (2c)

The polymer of example 4 and comparative example 1 are processed on a BOPP Stenter pilot line to produce a 20 μl plain biaxially oriented film. Polymers are extruded through a flat die as a sheet that is cooled under controlled conditions on a casting unit. After leaving the casting unit, the sheet is re-heated to an appropriate temperature and then stretched 4×1.1 in machine direction, by passing the film over a system of heated rolls running at different speeds. The stretching in transverse machine direction is achieved subsequently by a continuous drawing frame, which is enclosed in a hot air oven. The film is pre-heating in this oven (=pre-heating temperatures—as indicated in table) and then stretched 8 times in transverse machine direction by a system of chain-mounted clips moving on a diverging rail system. After the stretching, film is annealed and corona treated. Side edges are removed and finally the film is winded on a roll. Speed of the line is 70 m/nun.

TABLE 3

| | Example | |
|---|---|---|
| | 5 | 2c |
| Minimum oven pre-heating temperature, °C. | 162 | 164 |
| Optimum oven pre-heating temperature, °C. | 174 | 174 |
| Deviation on a 20 μ-thick film, μm | 1-2 | 0.5-3 |

The example 5 shows that, based on the deviation value, the film according to the present invention has a more uniform thickness than the film of the comparative example. It is also shown that the polymer can be stretched at a lower oven pre-heating temperature still obtaining an acceptable film, compared to polymer of the comparative example 2, meaning that polymer according to the present invention is easier processable compared to the comparative polymer.

EXAMPLES 6-8 AND COMPARATIVE EXAMPLE 3 (3c)

The compositions of examples 1-3 and comparative example 1 are compression moulded into 1.0 mm plaques and subsequently biaxially oriented on a TM (Tenter Frame) long stretching frame. The stretching occurs simultaneously at a fixed stretch ratio of 7 times in machine direction and 7 times in transverse machine direction.

Final film thickness of the biaxially oriented film is 20 μm.

Film properties are measured on the oriented film samples stretched at the optimum stretching temperature, which corresponds to 0% failure testing 5 plaques at each temperature.

The properties of the films are shown in Table 4.

TABLE 4

(Bi-oriented films from stretching frame)

| | Example | | | |
|---|---|---|---|---|
| | 6 | 7 | 8 | 3c |
| Elongation at break, % | 26 | 28 | 28 | 21 |
| Tensile stress at break, MPa | 140 | 145 | 146 | 135 |
| Tensile modulus, MPa | 2970 | 2730 | 2955 | 3180 |

Films according to the present invention show higher elongation at break and higher tensile stress at break versus the comparative film.

The invention claimed is:

1. A film or sheet comprising a propylene polymer comprising:
   1) a content of isotactic pentads (mmmm), measured by NMR, higher than 97%;
   2) a molecular weight distribution, expressed by $\overline{M}_w/\overline{M}_n$ ratio, rangers from higher than 8 to 11; and
   3) a value of $\overline{M}_z/\overline{M}_w$ ratio equal to or lower than 5.5; and
   4) a polydispersity index equal to or less than 5, wherein the polydispersity index is equal 54×(modulus separation)$^{-1.76}$, the modulus separation is equal to a frequency at G'=500 Pa/frequency at G"=500 Pa, and G' is a storage modulus and G" is a loss modulus.

2. The film or sheet of claim 1, wherein the propylene polmer further comprises a hard resin selected from coke oven gas, cracked naphtha, gas oil, terpene oil, or terpene resin.

3. The film or sheet of claim 1, wherein the propylene polymer further comprises a MFR value from 0.1 to 50 g/10 min.

4. The film or sheet of claim 3, wherein said MFR value is from 1 to 30 g/10 min.

5. The film or sheet of claim 1, wherein said film or sheet is biaxially oriented.

6. The film or sheet of claim 1, wherein the molecular weight distribution ranges from equal to or higher than 8.7 to 11.

7. The film or sheet of claim 1, wherein the film or sheet is a biaxially oriented film or sheet.

8. A film or sheet comprising a proylene polymer comprising:
   1) a content of isotactic pentads (mmmm), measured by NMR, higher than 97%;
   2) a molecular weight distribution, expressed by $\overline{M}_w/\overline{M}_n$ ratio, is equal to or higher than 8.7;
   3) a value of $\overline{M}_z/\overline{M}_w$ ratio equal to or lower than 5.5; and
   4) a polydispersity index equal to or less than 5, wherein the polydispersity index is equal 54×(modulus separation)$^{-1.76}$, the modulus separation is equal to a frequency at G'=500 Pa/frequency at G"=500 Pa, and G' is a storage modulus and G" is a loss modulus.

9. A multilayer laminated article comprising a film or sheet comprising a propylene polymer comprising:
   1) a content of isotactic pentads (mmmm), measured by NMR, higher than 97%;
   2) a molecular weight distribution, expressed by $\overline{M}_w/\overline{M}_n$ ratio, ranges from higher than 8 to 11; and
   3) a value of $\overline{M}_z/\overline{M}_w$ ratio equal to or lower than 5.5; and
   4) a polydispersity index equal to or less than 5, wherein the polydispersity index is equal to 54×(modulus separation)$^{-1.76}$, the modulus separation is equal to a frequency at G'=500 Pa/frequency at G"=500 Pa, and G' is a storage modulus and G" is a loss modulus.

10. The multilayer laminated article of claim 9, wherein the propylene polymer further comprises a hard resin selected from coke oven gas, cracked naphtha, gas oil, terpene oil, or terpene resin.

11. The multilayer laminated article of claim 9, wherein the propylene polymer further comprises a MFR value from 0.1 to 50 g/10 min.

12. The multilayer laminated article of claim 11, wherein said MFR value is from 1 to 30 g/10 min.

13. The multilayer laminated article of claim 9, wherein said film or sheet is biaxially oriented.

14. The multilayer laminated article of claim 9, wherein the molecular weight distribution ranges from equal to or higher than 8.7 to 11.

15. The multilayer laminated article of claim 9, wherein the film or sheet is a biaxially oriented film or sheet.

16. A multilayer laminated article comprising a film or sheet comprising a propylene polymer comprising:
   1) a content of isotactic pentads (mmmm), measured by NMR, higher than 97%;
   2) a molecular weight distribution, expressed by $\overline{M}_w/\overline{M}_n$, ratio, is equal to or higher than 8.7;
   3) a value of $\overline{M}_z/\overline{M}_w$ ratio equal to or lower than 5.5; and
   4) a polydispersity index equal to or less than 5, wherein the polydispersity index is equal to 54×(modulus separation)$^{-1.76}$, the modulus separation is equal to a frequency at G'=500 Pa/frequency at G"=500 Pa, and G' is a storage modulus and G" is a loss modulus.

* * * * *